July 9, 1929.　　　　　G. TIEMANN　　　　　1,720,579
EGG CASE
Original Filed Dec. 17, 1927　　2 Sheets-Sheet 1

George Tiemann
INVENTOR
BY Victor J. Evans
ATTORNEY

WITNESS:

July 9, 1929.　　　G. TIEMANN　　　1,720,579
EGG CASE
Original Filed Dec. 17, 1927　2 Sheets-Sheet 2

George Tiemann
INVENTOR
BY Victor J. Evans
ATTORNEY

WITNESS:

Patented July 9, 1929.

1,720,579

UNITED STATES PATENT OFFICE.

GEORGE TIEMANN, OF JOLIET, ILLINOIS.

EGG CASE.

Application filed December 17, 1927, Serial No. 240,870. Renewed April 13, 1929.

My present invention has reference to an egg case or crate, and my primary object is the provision of an egg receptacle which may be of smaller size than those usually employed and of a construction whereby the eggs will be effectively protected against breakage under even abnormal conditions, and further wherein the employment of excelsior or like packing for the eggs is entirely dispensed with.

A still further object is the provision of an egg case that includes units designed to be disposed one over the other, each being formed with substantially frusto-conical pockets adapted for alinement and providing therebetween egg receiving cells, the open top of the cells being closed by the respective units, and the said cells being arranged in diagonally opposed series, so that the cells provided by certain of the units will be arranged between the cells provided by these and by other units, with the result that a comparatively large number of eggs may be conveniently pocketed in the device, and whereby the walls provided by the separate but adjacent pockets reinforce the units and consequently the pockets and further whereby the eggs regardless of the size thereof are effectively nested and held from movement in any direction in their pockets.

A further object is the provision of a shipping case for eggs comprising a plurality of units designed to be arranged in superimposed relation and all positioned in a suitable case, each of said units being formed with cellular pockets designed for alinement, the said pockets being formed by stamping the units, and being reinforced by inner and outer faces, the said units being further stamped, shaped and reinforced to provide disc-like portions which form the top for the cellular pockets, the said pockets being arranged in a manner that will permit of the reception in the case of a larger number of eggs than can be shipped in cases of the same size.

To the attainment of the foregoing and other objects which will present themselves as the nature of the invention is better understood, the improvement also resides in certain other novel features of construction, combination and operative association of parts, one satisfactory embodiment of which is disclosed by the accompanying drawings.

Figure 1:
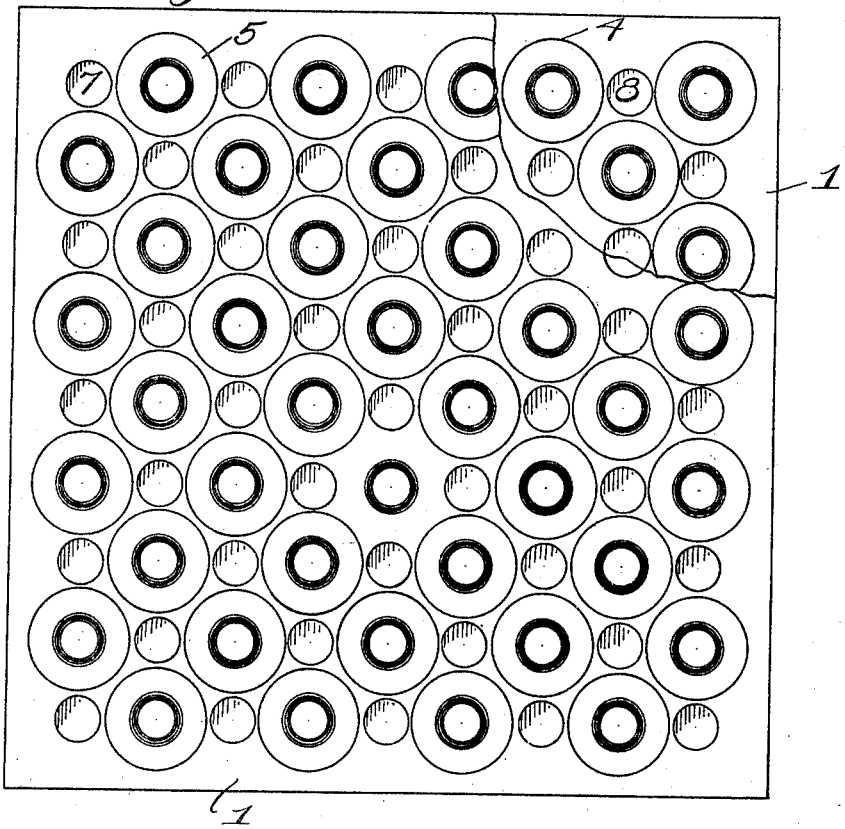
Figure 1 is a top plan view of the improvement.

Any desired number of units, which are preferably formed of paper pulp may be employed, but in the showing of the drawings I have illustrated only four of such units. The units are of a similar construction and are in the drawings indicated by the numeral 1. Each unit is arranged under a press which stamps the same to provide rows of longitudinally and transversely arranged circular weakened portions. The stamping machine also forms the said units with substantially V-shaped slits at their said circular weakened parts. The portions thus formed are bent outwardly in substantially frusto-conical shape. These portions provide equidistantly spaced substantially V-shaped fingers 3, and the fingers are surrounded and have secured thereto inner strips providing facings 4 and outer strips providing outer facings 5. In this manner it will be seen that the units are formed with frusto-conical pockets and that the said pockets are effectively reinforced. The inner facing 4 is preferably of comparatively thin paper, and, therefore, compressible but the outer facing 5 is preferably of stiff paper. Centrally between the semi-spherical pockets thus provided the units 1 are further stamped by the press to afford smaller circular weakened portions and substantially V-shaped fingers 6 which extend inwardly from said circular portions. These fingers are bent right angularly in an opposite direction from the pockets and thereafter are bent inwardly. The horizontal walls provided by the V-shaped tongues 6 have adhesively or otherwise secured upon both their inner and outer faces discs 7 and 8, respectively.

Figure 2:
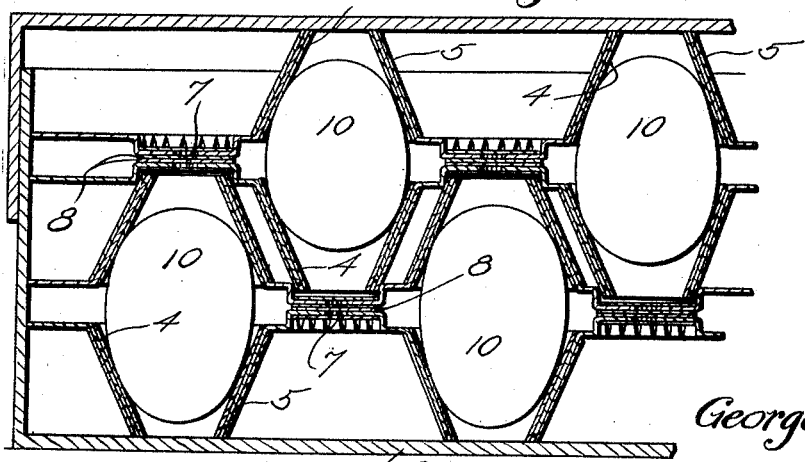
Figure 2 is a detail enlarged sectional view showing the units arranged in a case.
Figure 3:
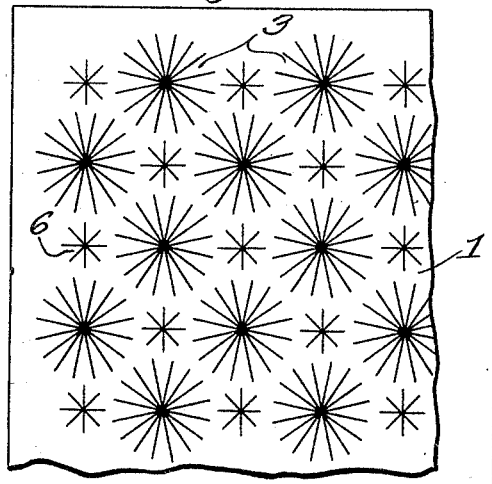
Figure 3 is a fragmentary top plan view of one of the units.
Figure 4:
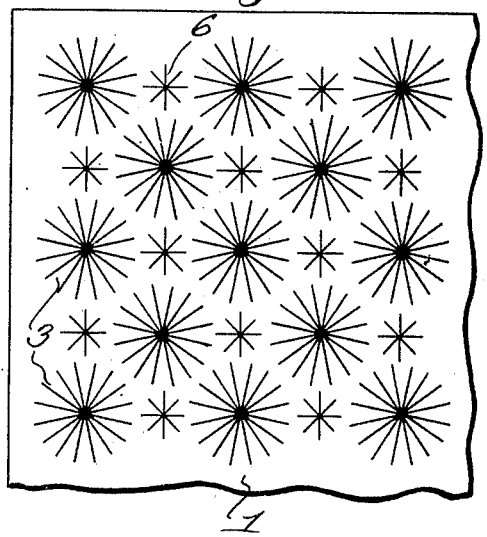
Figure 4 is a similar view of the unit to be disposed below the unit disclosed in Figure 3.
Figure 5:
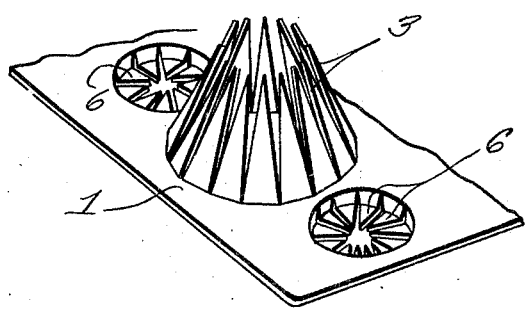
Figure 5 is a fragmentary perspective view showing the units stamped and shaped to provide the pockets and the tops for the pockets.
Figure 6:
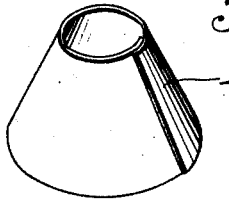
Figures 6 and 7 illustrate respectively in perspective the inner and outer faces for the pockets.
Figure 7:
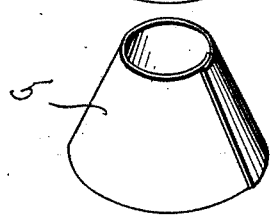
Figure 8:
Figure 8 shows in perspective the discs that provide the top members for the pockets.

While the frusto conical pockets of the units are disposed in both longitudinal and transverse series, the same are also arranged in diagonally opposite series, and for distinction I will refer to the said pockets as being thus formed on the units so that the depressed portions may be referred to as arranged in longitudinal and transverse series. The press or other machine employed for weakening and slitting the respective units does not operate upon the several units at exactly the same point so that the depressions having the discs of the units arranged next to each other, when all of the units are positioned in the box or case 9 provide the cover or top for the cellular pockets afforded by the cooperating or alining units of the remaining series. This, of course, is continued throughout so that all of the pockets are covered by the depressed portions of the respective superimposed units. By reference to Figure 2 of the drawings it will be seen that the cellular pockets provided by the outer superimposed pair of units 1 are arranged centrally with respect to the pockets provided by the next pair of superimposed pairs of units with the result that a comparatively great number of eggs may be arranged in the case even though the case is of a comparatively small size. Also by reference to the said Figure 2 it will be seen that the eggs 10 are caused to contact with the walls of the pockets and the said eggs are thereby held from movement when arranged in the case in any direction. The result is that the eggs are amply protected and will be prevented from breakage should the case be subjected to abnormal strain or shock. The intermediate units afford each cell with four separate and distinct walls, the said walls strengthening the cells as well as the units and producing a strong structure. The inner faces or linings of the cells are preferably compressible so that no injury can be inflicted to the eggs, but even when thin non-compressible material is employed for the inner facings or linings the same will assume a corrugated formation inasmuch as a portion of the said inner facing will be disposed in the spaces between the fingers 3, with the result that a tight gripping engagement of such facings with the eggs is produced.

The construction is of a simple nature, may be cheaply manufactured and will be found thoroughly efficient for its purpose. The improvement while preferably constructed of pulp, cardboard or like paper, may, of course, be formed of other material. The discs may be centrally perforated to afford an air entrance to the cellular pockets and the said discs, together with the fingers 6 forming the top of the said pockets and comprising with the fingers three layers of material both strong and effective and the contacting engagement of these discs when the units are arranged in the case will effectively hold the body portions of the said units from being brought into contact with each other and thereby reducing the area of the cells or permitting the walls of the said cells inflicting injury to the eggs.

While I have herein set forth a satisfactory embodiment of my improved device obviously I do not wish to be restricted to the precise details herein set forth and, therefore, hold myself entitled to make such changes therefrom as fairly fall within the scope of what I claim.

Having described the invention, I claim:—

An egg case, comprising a receptacle, flat units arranged in superimposed relation in the receptacle, each of said units having diagonally opposed equidistantly spaced frusto conical portions, formed by substantially V-shaped tongues and arranged in opposite directions to afford egg cells therebetween, inner and outer facings for the cells, said units, between the cells having longitudinal and transverse series of depressions, formed by V-shaped fingers, inner and outer facings for the depressions, said depressed portions being disposed to contact one with the other on the superimposed units and to space such units and provide closures for the open ends of the egg cells.

In testimony whereof I affix my signature.

GEORGE TIEMANN.